United States Patent
Korman et al.

(10) Patent No.: US 12,446,897 B2
(45) Date of Patent: Oct. 21, 2025

(54) CUTTING ELEMENTS

(71) Applicant: WRIGHT MEDICAL TECHNOLOGY, INC., Memphis, TN (US)

(72) Inventors: Zachary Korman, Memphis, TN (US); Jesse G. Moore, Germantown, TN (US)

(73) Assignee: WRIGHT MEDICAL TECHNOLOGY, INC., Memphis, TN (US)

(*) Notice: Subject to any disclaimer, the term of this patent is extended or adjusted under 35 U.S.C. 154(b) by 544 days.

(21) Appl. No.: 17/810,914

(22) Filed: Jul. 6, 2022

(65) Prior Publication Data
US 2023/0098719 A1 Mar. 30, 2023

Related U.S. Application Data

(60) Provisional application No. 63/249,063, filed on Sep. 28, 2021.

(51) Int. Cl.
*A61B 17/16* (2006.01)

(52) U.S. Cl.
CPC ............... *A61B 17/1615* (2013.01)

(58) Field of Classification Search
CPC . A61B 17/16; A61B 17/1613; A61B 17/1615; A61B 17/1617; A61B 17/162;
(Continued)

(56) References Cited

U.S. PATENT DOCUMENTS

| | | | | |
|---|---|---|---|---|
| 4,602,900 A | * | 7/1986 | Arpaio, Jr. | ............... A61C 3/02 408/230 |
| 4,728,231 A | * | 3/1988 | Kunimori | ............... B23B 51/02 408/230 |

(Continued)

FOREIGN PATENT DOCUMENTS

| | | |
|---|---|---|
| EP | 3777750 A1 | 2/2021 |
| WO | 2012068641 A1 | 5/2012 |
| WO | 2019140482 A1 | 7/2019 |

OTHER PUBLICATIONS

Partial European Search Report issued in connection with corresponding European Patent Application No. 22183899.8, Dec. 5, 2022, 11 pages.

*Primary Examiner* — Eric S Gibson
(74) *Attorney, Agent, or Firm* — DUANE MORRIS LLP

(57) ABSTRACT

Cutting elements may include points, tips, cutting portions and/or shafts of various geometries depending on requirements of the intended use. Tip geometries described may be used for cutting burrs, k-wires and/or drill bits in many types of applications. In particular, the tip geometries described may be used in medical applications. For example, tip geometries as described herein may be used for drilling bones, cartilage, and similar structures during surgery. Tip geometry may influence cutting ability. Use of the tip geometries described may allow the cutting element to be positioned at varying angles relative to the surface to be cut. In some instances, a tip geometry for a cutting element may be selected such that it reduces and/or inhibits movement of the cutting element during use and/or allows for a predetermined angle of entry into a surface to be cut. Using the designs described herein may reduce and/or inhibit damage, heat, and/or trauma to materials that are to be cut, for example, tissues such as bone and/or cartilage.

8 Claims, 12 Drawing Sheets

(58) Field of Classification Search
CPC ............ A61B 17/1622; A61B 17/1624; A61B 17/1626; A61B 17/1628; A61B 17/1655; A61B 17/1657; B23B 2251/14; B23B 51/02
See application file for complete search history.

(56) References Cited

U.S. PATENT DOCUMENTS

| | | | | |
|---|---|---|---|---|
| 4,789,276 | A * | 12/1988 | Clarke | B23B 51/02 408/230 |
| 5,110,245 | A * | 5/1992 | Hiroyuki | F16B 25/0047 411/417 |
| 5,429,504 | A * | 7/1995 | Peltier | A61C 8/0089 433/165 |
| 5,452,971 | A * | 9/1995 | Nevills | B23B 51/02 408/229 |
| 5,575,650 | A * | 11/1996 | Niznick | A61B 17/1615 433/165 |
| 5,759,185 | A * | 6/1998 | Grinberg | B23C 5/28 606/180 |
| 6,258,093 | B1 * | 7/2001 | Edwards | A61B 17/164 606/85 |
| 7,237,986 | B2 * | 7/2007 | Anjanappa | B23B 51/02 408/230 |
| 7,892,235 | B2 * | 2/2011 | Ellis | B23B 51/02 606/80 |
| 8,162,945 | B2 * | 4/2012 | Ellis | B23B 51/00 606/80 |
| 8,172,845 | B2 * | 5/2012 | Ellis | B23B 51/00 606/80 |
| 8,460,298 | B2 * | 6/2013 | O'Donoghue | A61B 17/1615 606/80 |
| 9,089,346 | B2 * | 7/2015 | Schoutens | A61B 17/1615 |
| 9,949,776 | B2 * | 4/2018 | Mobasser | A61B 17/8635 |
| 10,589,364 | B2 * | 3/2020 | Terashima | B23B 51/02 |
| 10,610,243 | B2 * | 4/2020 | Sommers | A61B 17/72 |
| 10,912,572 | B2 * | 2/2021 | Kunz | A61C 1/084 |
| 10,987,111 | B2 * | 4/2021 | Feldmann | A61B 17/1615 |
| 11,039,842 | B1 * | 6/2021 | Bennett | A61B 17/164 |
| 11,298,169 | B2 * | 4/2022 | Shmueli | A61C 1/084 |
| 11,679,442 | B2 * | 6/2023 | Sinnott | B23B 51/02 408/224 |
| 11,871,973 | B2 * | 1/2024 | Shmueli | A61C 13/1009 |
| 2003/0185640 | A1 * | 10/2003 | Ito | B23B 51/02 408/230 |
| 2005/0203526 | A1 * | 9/2005 | Ellis | B23B 51/00 606/80 |
| 2006/0285940 | A1 * | 12/2006 | Walther | F16B 25/0068 411/421 |
| 2008/0051793 | A1 * | 2/2008 | Erickson | A61B 17/1671 606/279 |
| 2008/0249579 | A1 * | 10/2008 | Taylor | A61B 17/863 606/301 |
| 2009/0048602 | A1 * | 2/2009 | O'Donoghue | A61B 17/1615 606/80 |
| 2009/0216235 | A1 * | 8/2009 | Ellis | A61B 17/1615 408/199 |
| 2009/0222009 | A1 * | 9/2009 | Ellis | A61B 17/1615 606/80 |
| 2010/0028098 | A1 * | 2/2010 | Shaffer | B23B 51/02 408/230 |
| 2011/0070558 | A1 * | 3/2011 | Park | A61C 8/0025 433/174 |
| 2011/0098756 | A1 * | 4/2011 | Brannon | A61B 17/8625 606/309 |
| 2012/0004661 | A1 * | 1/2012 | Leppelmeier | A61B 17/1615 606/80 |
| 2012/0136398 | A1 * | 5/2012 | Mobasser | A61B 17/8635 606/311 |
| 2012/0158000 | A1 * | 6/2012 | Ellis | A61B 17/1615 606/80 |
| 2013/0011810 | A1 * | 1/2013 | Cho | A61C 8/0089 433/165 |
| 2013/0022942 | A1 * | 1/2013 | Zadeh | A61C 8/0068 606/301 |
| 2014/0276840 | A1 * | 9/2014 | Richter | A61B 17/1615 606/80 |
| 2014/0276843 | A1 * | 9/2014 | Koay | A61B 17/16 606/80 |
| 2015/0086942 | A1 * | 3/2015 | Hwang | A61C 8/0069 433/174 |
| 2015/0173776 | A1 * | 6/2015 | Burke | A61B 17/1613 606/80 |
| 2015/0209054 | A1 * | 7/2015 | Atabey | A61B 17/1615 606/80 |
| 2015/0342617 | A1 * | 12/2015 | Kunz | A61B 17/1615 433/215 |
| 2017/0172704 | A1 * | 6/2017 | Parke | A61C 3/02 |
| 2018/0281085 | A1 * | 10/2018 | Leblanc | A61B 17/1673 |
| 2018/0289432 | A1 * | 10/2018 | Kostrzewski | A61B 34/20 |
| 2019/0029696 | A1 * | 1/2019 | Feldmann | A61B 17/1615 |
| 2019/0105060 | A1 * | 4/2019 | Sommers | A61B 17/8645 |
| 2019/0290299 | A1 * | 9/2019 | Pacaccio | A61B 17/1615 |
| 2019/0299302 | A1 * | 10/2019 | Terashima | B23B 51/02 |
| 2019/0388979 | A1 * | 12/2019 | Sinnott | A61B 17/1615 |
| 2020/0163704 | A1 * | 5/2020 | Shmueli | A61C 8/0022 |
| 2020/0323574 | A1 * | 10/2020 | Picha | A61B 17/742 |
| 2020/0353543 | A1 * | 11/2020 | Laird | A61C 3/02 |
| 2023/0054778 | A1 * | 2/2023 | Arai | A61B 17/1615 |
| 2023/0098719 | A1 * | 3/2023 | Korman | A61B 17/848 408/230 |
| 2023/0301677 | A1 * | 9/2023 | Korman | A61B 17/32002 |

* cited by examiner

CUTTING ELEMENTS

CROSS-REFERENCE TO RELATED APPLICATION

This application claims priority under 35 U.S.C. § 119(e) to U.S. Provisional Application No. 63/249,063, filed on Sep. 28, 2021, the entire contents of which are incorporated herein by reference.

TECHNICAL FIELD

The disclosure relates to tip geometries for cutting elements. Tip geometry may influence cutting ability. Tip geometries described may be used for cutting burrs and/or drill bits in many types of applications. In particular, the tip geometries described may be used in medical applications. For example, tip geometries as disclosed herein may be used for drilling bones, cartilage, and similar structures during surgery. Use of the tip geometries described may allow the cutting element to be positioned at varying angles relative to the surface to be cut. In some instances, a tip geometry for a cutting element may be selected such that it reduces and/or inhibits movement of the cutting element during use. Using the bit designs described herein may reduce and/or inhibit damage, heat, and/or trauma to materials that are cut, for example, tissues such as bone and/or cartilage.

BACKGROUND

Tips for cutting vary based on use and materials used in both the tips and the surface to be cut. Selection of a particular drill bit may affect quality of the cut during use. For example, the material to be cut may be considered when determining what type of drill bit to use, for example, when determining a material for the bit and/or the geometry of the bit. Drill bits may be selected based on their ability to bite into the material to be cut and/or the ability to maintain a desired position during use.

Examples of a prior art drill bits for use in orthopedic surgeries are shown in FIGS. 1-5. As depicted in these figures the prior art drill bits include a pyramidal shaped end that defines a drill point. Conventional drill bits 2, as shown in FIG. 1, include a pyramidal shaped end 10 on shaft 12 that defines drill point 14. FIGS. 3-4 also depict conventional drill bits 4, 6, including the pyramidal shaped end 11 and drill point 15, 16, respectively. As shown in FIG. 2A-B, prior art drill bits 22, 24 are shown having points 20 formed by surfaces 26a, 26b, 26c, 28a, 28b, 28c having cutting edges 30a, 30b, 30c, 32a, 32b, 32c, respectively. FIG. 2B depicts the use of flutes 34a, 34b, 34c positioned in the surfaces 28a, 28b, 28c, respectively. In the prior art embodiments, as shown in FIG. 2B, flutes 34a, 34b, 34c are positioned on surfaces 28a, 28b, 28c. Additionally, FIG. 5 depicts the use of flutes 38 in prior art drill bit 8.

Surgical procedures are complicated and time consuming and often require surgical teams and specifically surgeons to work in a confined space with little room to maneuver. For example, it is known that existing orthopedic drill bits may move when drilling through bone and cartilage. In particular, periosteum which covers bone is often slippery and when drilling, particularly in complex procedures, conventional drill bits have a tendency to move during use. This movement presents a risk to the periosteum, bone, and to adjacent body parts including muscles, tendons, skin, organs, etc.

Thus, tools for use in surgery need to be constructed in a manner that reduces or inhibits potential unnecessary movements during use. Designs that provide surgeons with superior control, accuracy and performance are of particular interest. This results in reduced damage, heat and trauma to the tissues and leads to faster operations, more first-time results and an overall improvement in post-surgery healing.

Tip geometries described herein may be used for cutting burrs and/or drill bits in many types of applications and may be used in medical applications in orthopedics, ENT (ear, nose and throat), neurosurgery, craniomaxillofacial, plastic and/or reconstructive surgery. In particular, tips described herein may be used in minimally invasive procedures, osteotomies, arthrodesis, or the like.

Tip geometries for cutting elements described herein may be used in cutting burrs, k-wires, and/or drill bits for many types of applications. For example, tip geometries and/or drill bits described may be used in orthopedic applications. In particular, tip geometries as described herein may be used for drilling bones, cartilage, and similar structures during orthopedic surgeries.

SUMMARY

Cutting elements such as tips, drill bits, Kirchner wires ("k-wires"), and/or elements thereof may be formed from materials selected for particular properties of interest. Materials used may be selected based on properties such as compatibility with in vivo use, strength such as yield strength and/or ultimate strength, Young's modulus, creep/viscoelasticity, fatigue, resistance to abrasive wear, compatibility with post-processing procedures such as cleaning, and sterilization and/or other properties of interest, and/or properties that affect ease of manufacturing such as material machinability and/or ease of use in forming.

Materials of interest for use in cutting elements such as tips, drill bits, k-wires, and/or elements thereof may include but are not limited to metals, titanium, tantalum, and niobium, alloys like stainless steel such as surgical quality stainless steel, cobalt-chromium alloys, titanium alloys, aluminum alloys, and/or nitinol. In some embodiments, it may be desired to use a material having a hardness selected based on the requirement of use.

Cutting elements may include a point, such as an engaging point at an end. The engaging point may be configured to engage a material to be cut. For example, the engaging point may be configured to engage biological materials, such as bone, cartilage, or the like. The cutting element may include a tip, an end of which is the engaging point. The tip may have faces forming surfaces of the tip. Tips may have a predetermined shape based on properties of interest. In particular, a tip may be formed in the shape of a cone or conical shape.

In some instance, faces of the tip may extend toward a cutting portion of the cutting element. The cutting portion may include gashes and faces. An intersection of a face and a gash may form a cutting edge.

A cutting element may include a shaft portion coupled to the tip. A portion of the cutting element may include flutes. In particular, the shaft portion may include one or more flutes. For example, multiple flutes may be positioned on the shaft. Flutes may have discontinuous edges. For example, the flutes may include one or more chip splitters at an edge of a flute. A plurality of chip splitters at edges of flutes may be used in some embodiments.

Flutes and gashes may communicate. In particular, the flutes and gashes may communicate in such a manner such that debris is guided away from a cutting location.

In an embodiment, a cutting element may include an engaging point and a conical tip proximate the engaging point. The conical tip may be positioned proximate to a cutting portion that include faces forming at least a surface of the cutting portion. Further, the cutting portions may include gashes. The gashes and faces may intersect at cutting edges. The cutting element may include a point, a tip, cutting portion, and a shaft. In some instances, the tip and shaft may be integrally formed.

The shaft may include flutes having a plurality of chip splitters at edges of the flutes. The flutes may communicate with the gashes of the tip. In some instances, the flutes and the gashes have a geometry that facilitates and guides debris away from a cutting location.

Cutting elements may be drill bits. In some embodiments, the drill bit may include a conical shaped tip defining a drill point. A cutting portion may include faces and gashes. In some instances, the drill bit includes a shaft formed integrally with a conical shaped tip. Drill bits may include a shaft having one or more flutes.

In some instances, drill bits may have flutes with edges that are discontinuous. Drill bits may include one or more flutes that include a plurality of chip splitters at edges of the one or more flutes. In some embodiments, drill bits may include a number of flutes in a range from about 2 flutes to about 6 flutes.

Drill bits may include one or more flutes that communicate with at least one of the one or more gashes.

Drill bits may include one or more faces that define at least a portion of a cutting portion. In some instances, drill bits may include a shaft having one or more flutes communicating with one or more gashes such that debris is guided away from a cutting location.

An element for use in medical procedures may include an engaging point configured to engage a biological material. The tip may be positionable at one or more angles relative to the surface to be cut, for example, a biological material. A medical element for use in cutting may include a conical tip proximate the engaging point. Cutting portion may be positioned proximate to the tip. In some instances, faces of the cutting portion may form outer surfaces of the element. Further, the tip may include sections in which one or more gashes are formed. Cutting edges may be positioned on the tip. For example, in some instances a cutting edge that is configured to cut the biological material may be formed at an intersection of the one or more faces and the one or more gashes.

Elements for cutting in medical procedures may include a shaft portion proximate the tip of the element. The shaft may include flutes that include a plurality of chip splitters at edges of the flutes. In some instances, flutes on a shaft communicate with gashes positioned on a tip.

Flutes and/or gashes may be designed to guide debris away from a cutting location.

A k-wire for use in medical procedures may include an engaging point configured to engage a biological material at one or more angles. The engaging point may be positioned proximate a conical tip, a cutting portion that includes one or more faces forming at least a surface of the tip, one or more gashes formed in the tip, and/or a cutting edge configured to cut the biological material formed at an intersection of the one or more faces and the one or more gashes. The conical tip may be positioned proximate a shaft portion that includes flutes having a plurality of gashes at edges of the flutes. Some of the flutes may communicate with some of the gashes.

A burr for use in medical procedures may include an engaging point configured to engage a biological material at one or more angles. The engaging point may be positioned proximate a conical tip that includes one or more faces forming at least a surface of the tip, one or more gashes formed in the tip, and/or a cutting edge configured to cut the biological material formed at an intersection of the one or more faces and the one or more gashes. The conical tip may be positioned proximate a shaft portion that includes flutes having a plurality of gashes at edges of the flutes. Some of the flutes may communicate with some of the gashes.

Disclosed embodiments may be used in a variety of applications and methods, including cutting. For example, the elements and/or drill bits described herein may be used in surgical methods for operating on a patient, and, in particular, on a patient's hand and/or foot. Material selection may also be influenced by the design of an instrument and/or elements thereof. In particular, size of the instrument and/or elements and/or the desired fit between the instrument, elements, and/or the target area may necessitate use of specific materials to meet the requirements of use.

Medical procedures, such as surgeries, are complicated and time consuming and any steps that can be improved upon may decrease surgical time, thereby potentially reducing infection risk for the patient and likely increasing patient and/or doctor satisfaction. Cutting elements may include a geometry selected to engage a biological material such as bone and/or cartilage. For example, a point of the cutting element may be selected for its ability to engage biological materials. In particular, points of particular geometries may reduce and/or inhibit slippage of the cutting element. Such cutting elements may enable rapid drilling of the bone.

Although the invention has been described in terms of exemplary embodiments, it is not limited thereto. Rather, the appended claims should be construed broadly, to include other variants and embodiments of the invention, which can be made by those skilled in the art without departing from the scope and range of equivalents of the invention.

BRIEF DESCRIPTION OF THE DRAWINGS

These and other features and advantages of the apparatuses and methods described herein will be more fully disclosed in, or rendered obvious by, the following detailed description of the preferred embodiments, which is to be considered together with the accompanying drawings wherein like numbers refer to like parts.

DETAILED DESCRIPTION

Figure 1:
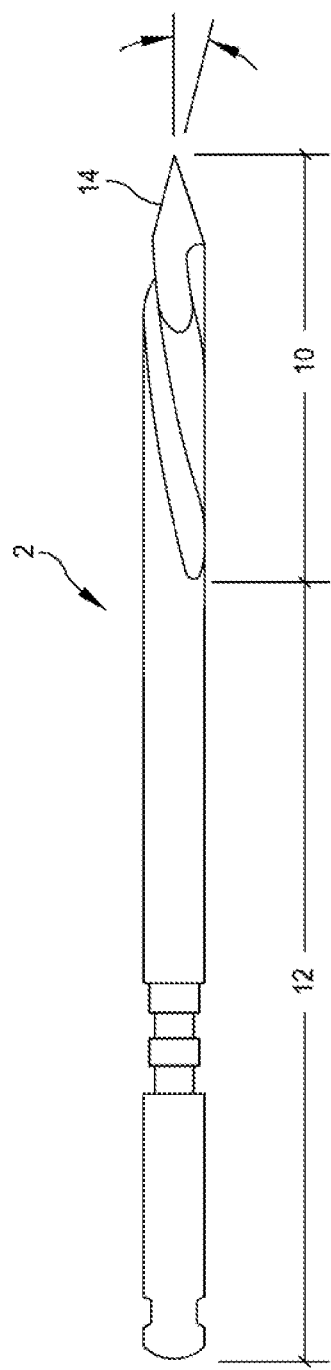
FIG. 1 depicts a side view of a prior art drill bit for use in orthopedic surgery.
Figure 2B:
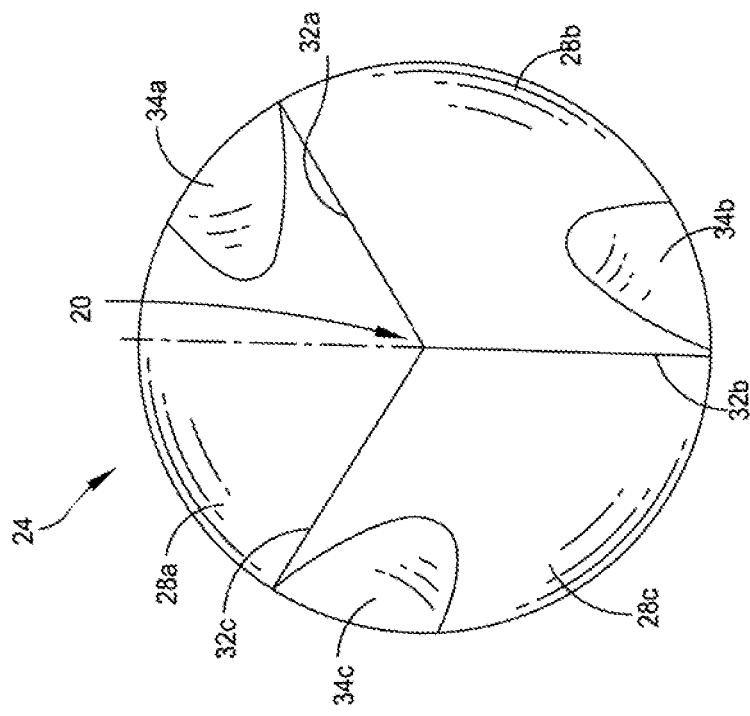
FIGS. 2A-B depict end views of embodiments of prior art drill bits.
Figure 2A:
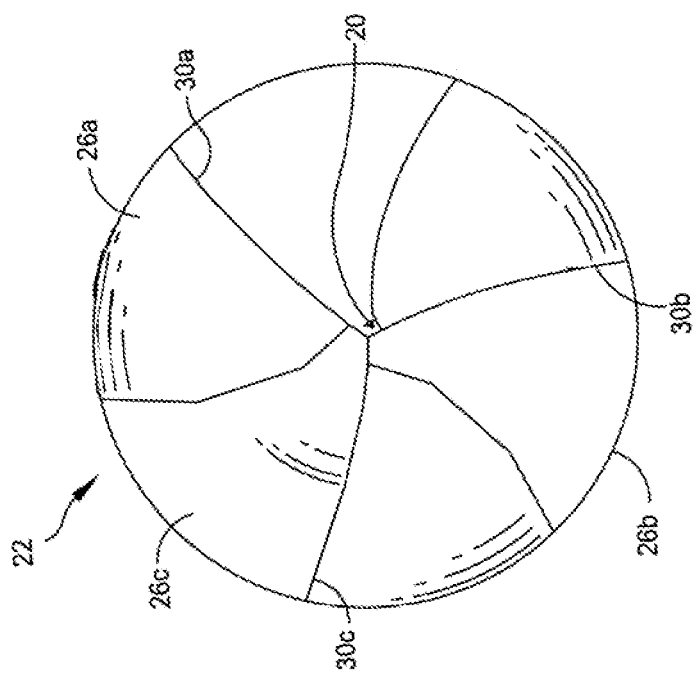
Figure 3:
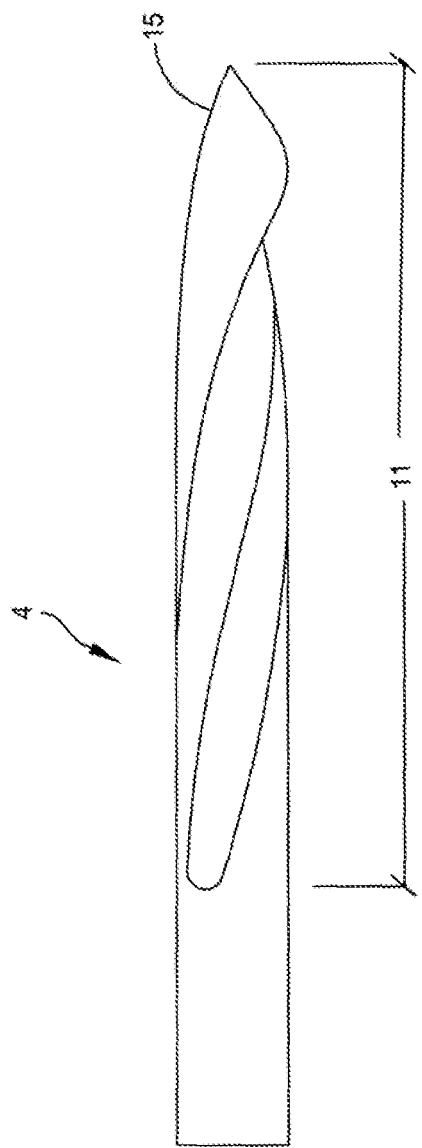
FIG. 3 depicts a side view of a prior art drill bit for use in orthopedic surgery.
Figure 4:
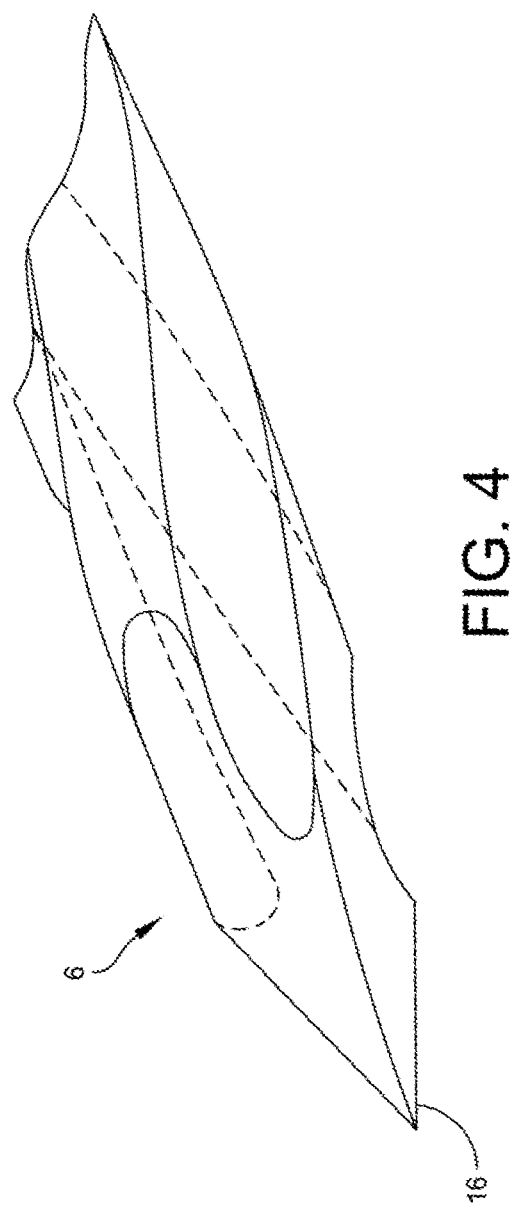
FIG. 4 depicts a perspective view of a prior art drill bit.
Figure 5:
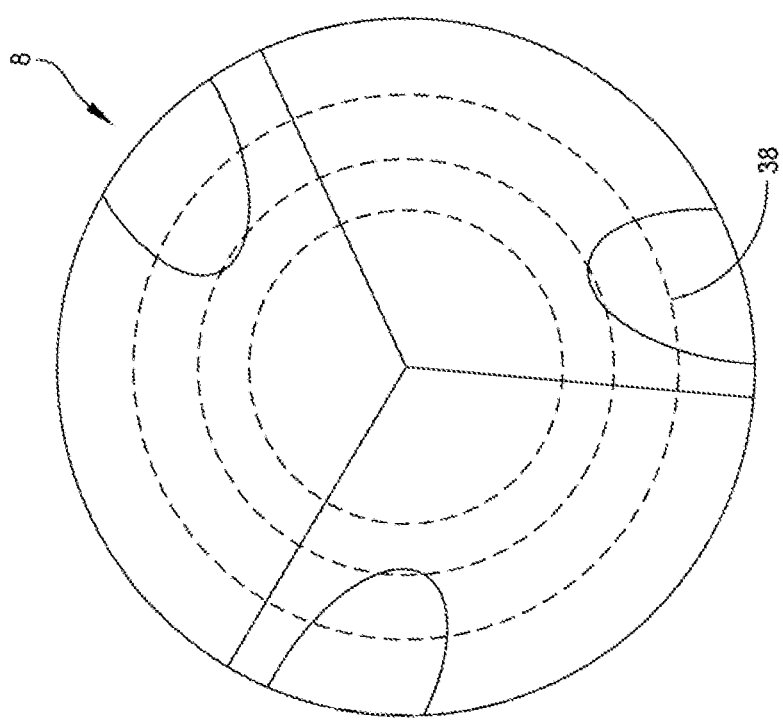
FIG. 5 depicts an end view of an embodiment of a prior art drill bit.

This description of the embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The disclosure relates to tip geometries for cutting elements. Tip geometry may influence properties such as cutting ability, preferred angles of entry of tip to cutting surface, ability of tip to engage with surface of the material to be cut, as well as the range of angles falling within an allowable obliquity between a central axis of the cutting element and a target area of a material to be cut, etc. For example, a tip geometry of the cutting elements described herein may allow for drilling angles that are shallower than are possible when using conventional drill bits, burrs, or k-wires.

In particular, the tip geometries of the cutting elements may inhibit and/or reduce slippage and/or skiving allowing the cutting elements to form substantially straight holes when the cutting element is positioned at angles relative to the material to be cut that would not be possible if using a conventional bit, k-wire, or burr.

In some instances, tip geometry may be selected for a particular use. For example, a tip geometry may be selected for use to enhance a plunge cutting ability. Tip geometries described may be used for cutting burrs, k-wires, and/or drill bits in many types of applications.

In particular, the tip geometries described herein may be used in medical applications. For example, tip geometries as described herein may be used for drilling bones, cartilage, and similar structures during surgery. Use of the tip geometries described may allow the cutting element to be positioned at varying angles relative to the surface to be cut. In some instances, a tip geometry for a cutting element may be selected such that it reduces and/or inhibits movement of the cutting element during use. Using the bit designs described herein may reduce and/or inhibit damage, heat, and/or trauma to materials that are cut, for example, tissues such as bone and/or cartilage.

Design of a cutting element and, in particular, geometries of various elements of the cutting element may affect the cutting ability and/or effectiveness of the cutting element such as drill bit during use. For example, tip geometries may affect the cutting ability of a tip and/or a drill bit. For example, a specific tip geometry may have an impact on the plunge cutting ability of a cutting element such as a drill bit or a cutting burr.

Figure 6:
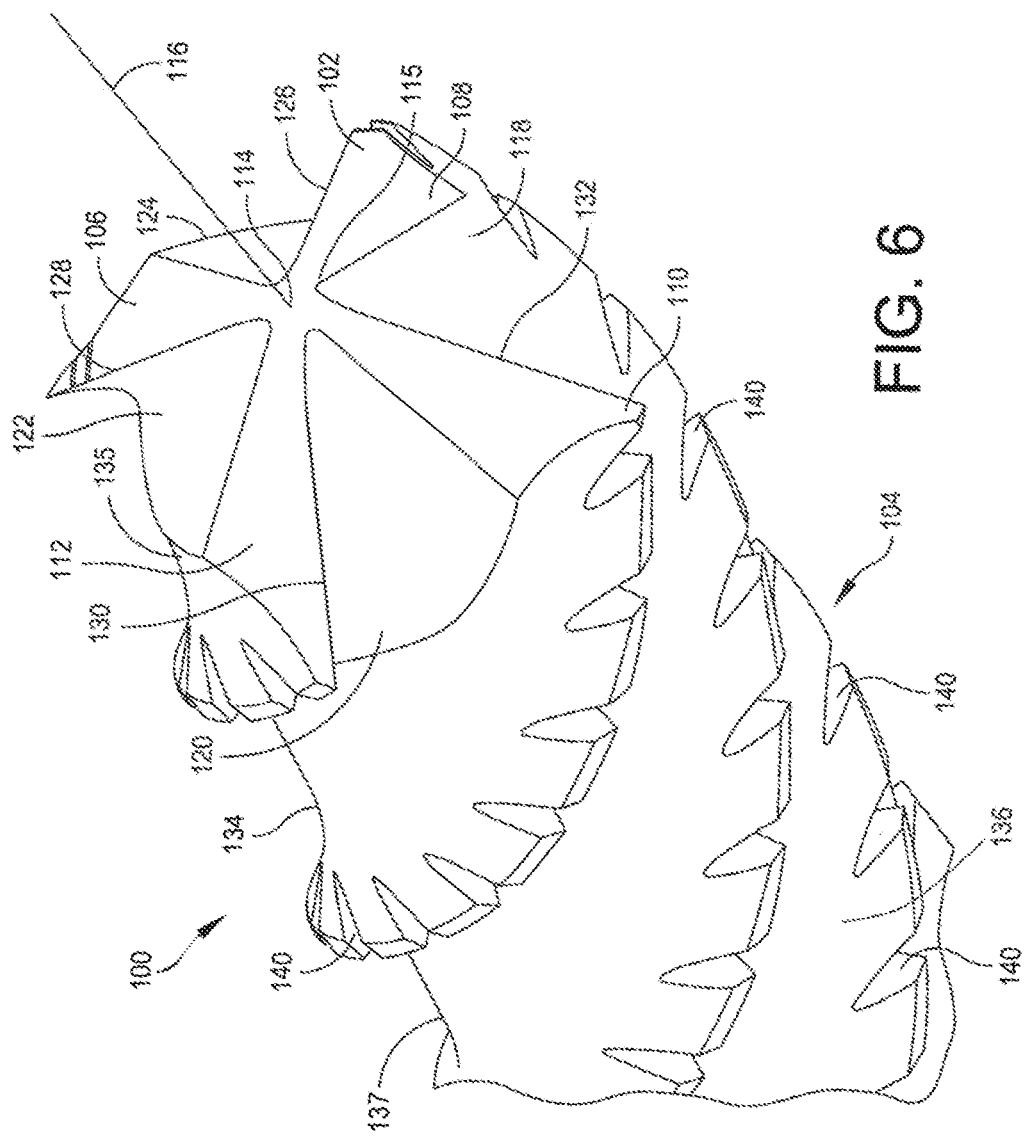
FIG. 6 depicts a perspective view of a tip, in particular a conical gashtip, for a cutting element of the invention.

Cutting elements may include burrs, k-wires, or drill bits. As shown, FIG. 6 depicts a perspective view of drill bit 100 that includes conical tip 115 and shaft 104. A geometry of the point 114 on the tip 115 may be selected based on the desired use.

Faces 106, 108, 110, 112 extend from point 114 in such a manner that faces generally follow a conical shape away from point 114. Faces 106, 108, 110, 112 of conical tip 115 may be positioned at a predetermined angle with respect to longitudinal axis 116 running through the middle of both conical tip 115 and shaft 104. For example, faces 106, 108, 110, 112 of conical tip 115 form a predetermined angle of about 30° with longitudinal axis 116 running through the middle of drill bit 100.

In some embodiments, a cutting element may have a point and a tip, where the tip proximate to the point forms an angle in a range from about 30 degrees to about 60 degrees with a central longitudinal axis of the cutting element.

In some instances, faces of the conical tip may extend from the conical tip down the cutting portion at the same angle measured from the central longitudinal axis of the cutting element. Alternatively, in some embodiments the faces of the conical tip may form a different angle with the central longitudinal axis of the cutting element than the faces of the cutting portion.

Faces of a conical tip may form an angle in a range from about 20° to about 80° with a longitudinal axis running through the middle of cutting element. In some instances, an angle formed between one or more faces of the tip and the longitudinal axis of the cutting element may be in a range from about 30 to about 60 degrees. For example, a cutting burr may have a face on the tip that forms an angle in a range from about 30 to about 60 degrees with a longitudinal axis of the cutting element. An angle of one or more faces of the cutting element may be selected to inhibit and/or prevent slipping of the tip on a target bone surface. In this manner, the tip geometries of the cutting elements may inhibit and/or reduce slippage and/or skiving of cutting elements.

Tip geometries may be selected based on a desired geometry for the holes to be drilled into a target material. For example, cutting elements described herein may be designed and/or constructed to form substantially straight holes when the cutting element is positioned at angles relative to the material to be cut that would not be possible if using a conventional bit, k-wire, or burr.

In some embodiments, it may be desirable for an angle between an outer face of a conical tip and a central longitudinal axis of the cutting element to be less than about 30 degrees. For example, some drill bit and/or K-wire tips may include an angle between conical tip faces and the central longitudinal axis that is as shallow as possible. Such a shallow angle for the angle between a face of the conical tip and the central longitudinal axis may be selected to allow drilling at the shallow angles relative to a bone surface (i.e., far from perpendicular to the bone surface).

In the embodiment shown in FIG. 6, an angle between faces 106, 108, 110, 112 of conical tip 115 and a longitudinal axis 116 of the cutting element 100 is about 30 degrees. Cutting portion 102 includes gashes 118, 120, 122, 124 and faces 106, 108, 110, 112. As shown in FIG. 6, gashes 118, 120, 122, 124 have cutting edges 126, 128, 130, 132. Gashes

118, 120, 122, 124 and faces 106, 108, 110, 112 of the cutting portion 102 may extend a predetermined distance along the longitudinal axis 116 of the drill bit, k-wire, or burr based on type of use, material to be cut, desired properties of cut, etc. As shown in FIG. 6, an angle formed between a plane of surface of the gashes 118, 120, 122, 124 and the central longitudinal axis 116 of the cutting element 100 is about 18 degrees.

In some embodiments, an angle between a surface of the gashes and the central longitudinal axis may be less than an angle between an outer surface of the conical tip and the central longitudinal axis of the cutting element. For example, an angle between a surface of the gashes and the central longitudinal axis may be selected to be smaller than an angle between an outer surfaces of the conical tip and the central longitudinal axis of the cutting element. In some instances, angles selected for the gashes and/or the conical tip surfaces relative to the central longitudinal axis may depend upon materials used, intended use for the cutting element, and/or manufacturing limitations.

In a particular example, an outer surface of a tip of a burr forms an angle of about 30 degrees with a central longitudinal axis of the burr. A further burr example may have an angle of 18 degrees between the outer surfaces of the conical tip and the central longitudinal axis of the burr. In a specific k-Wire embodiment, outer surfaces of a tip form a tip angle of about 18 degrees with a central longitudinal axis. In some embodiments, surfaces of the gashes may be positioned at an angle of about 12 degrees from a central longitudinal axis of a cutting element such as a k-wire.

In some instances, flutes may extend from the conical tip along the shaft. Flutes may include edges, which in some embodiments may be discontinuous. For example, as shown in FIG. 6, flutes 134, 135, 136, 137 extend along shaft 104 and include chip splitters 140 on the flutes 134, 135, 136, 137. FIG. 6 depicts an embodiment of a cutting element 100 having four flutes 134, 135, 136, 137. As shown, tip 115 extends a predetermined distance from point 114 along a longitudinal axis 116 of the tip 115. Flutes 134, 135, 136, 137 with chip splitters 140 intersect with gashes 118, 120, 122, 124 in such a way as to guide debris away from a cutting location. Gashes 118, 120, 122, 124 in the conical tip 115 differ in geometry from flutes 134, 135, 136, 137 extending along drill bit 100.

Figure 7:
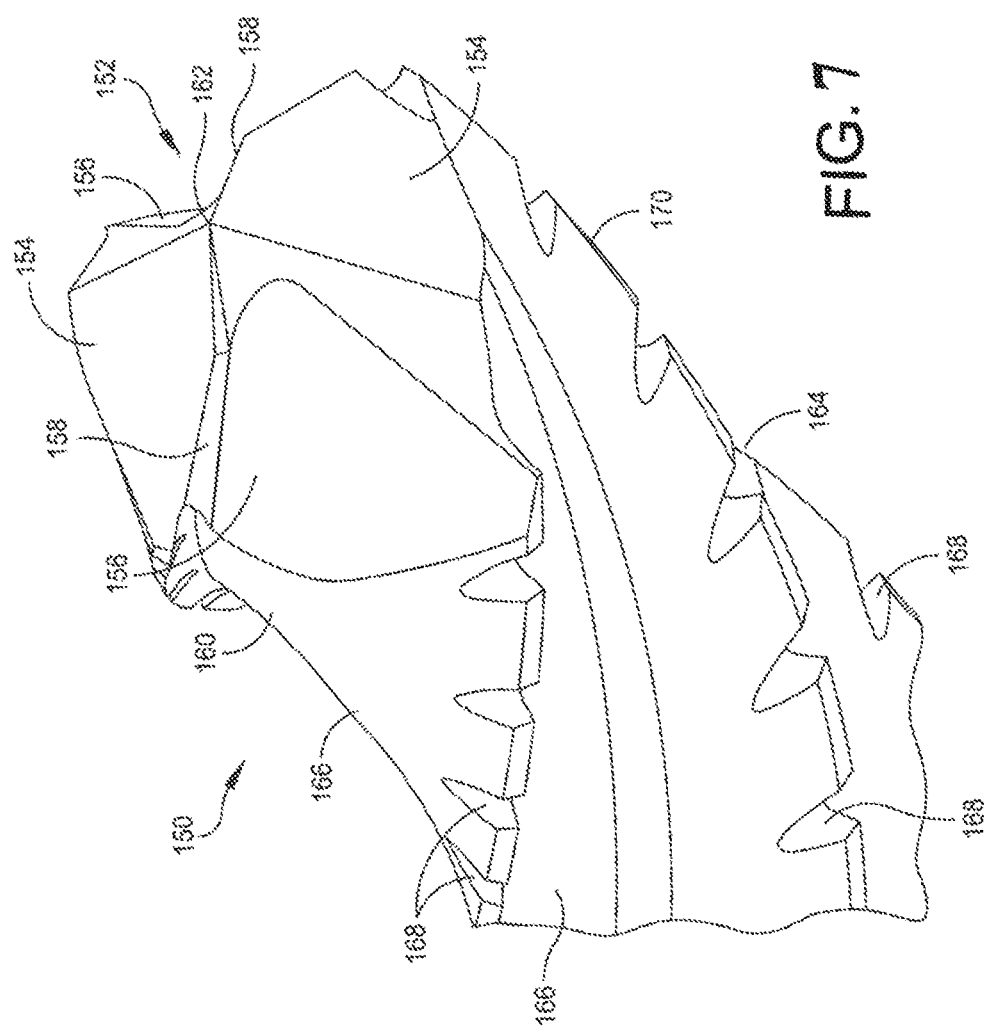
FIG. 7 depicts a perspective view of a tip, in particular a split-point drill tip, for a cutting element of the invention.

Flutes may communicate with gashes of the conical tip. In some embodiments, a number of flutes may differ from a number of gashes. For example, as shown in FIG. 6, four gashes 118, 120, 122, 124 are in communication with the four flutes 134, 135, 136, 137 on the shaft 104 of the cutting element 100. In contrast, FIG. 7 depicts an embodiment of a cutting element 150 having two gashes 156 in communication with two of the four flutes 166 on the shaft 164 of the cutting element 150. Various combinations in the number of gashes in the tip and flutes in the shaft may be used depending on the properties desired in the cutting element.

In some instances, the angle formed by the faces with respect to a longitudinal axis of the cutting element differs from the angle the flutes and/or gashes with respect to the longitudinal axis running through a centerline of the cutting element.

Elements of tip 115 and drill bit 100 shown in FIG. 6 may be used for used for procedures involving the foot such as osteotomies, exostectomies, minimally invasive surgeries such as minimally invasive foot surgeries, for example, MIS for bunions, arthrodesis surgeries, or the like.

In a K-Wire embodiment, an angle between a face of a tip with a longitudinal axis of the K-wire may be about 18 degrees. Some K-wire embodiments may be designed such that an angle between one or more faces and the longitudinal axis of the cutting element is about 15 degrees. In some embodiments, grinding the tip at smaller and smaller angles may result in a loss of strength of the drill point. Materials may be selected for use, for example, to enhance strength of a cutting element, such as a k-wire, to enhance strength of a particular design of a cutting element.

Tips for use in cutting elements may have various shapes including, but not limited to, cones or portions thereof. In some instances, tips may include cutting surfaces on and/or proximate the tip. FIG. 7 depicts a perspective view of a tip, in particular a split-point tip 152, for cutting element 150 such as a burr, a k-wire, or a drill bit of the invention. For example, an embodiment may include utilizing split-point drill tip 152 on end of cutting element 150 such as a cutting burr. As shown in FIG. 7, faces 154 intersect at point 162. Faces 154 and gashes 156 alternate around the circumference of the tip 152. Cutting edges 158 are positioned proximate gashes 156. Gashes 156 are positioned and designed in a manner to guide debris away from the cutting surfaces. Gashes 156 extend from the tip 152 down the cutting portion 160 to the shaft 164 of cutting element 150 from point 162. Tip 152 and shaft 164 are coupled together such that the gashes 156 are in communication with flutes 166. Flutes 166 include chip splitters 168 along edges 170. Flutes 166 with chip splitters 168 intersect with gash 156 of the tip 152 in such a way as to guide debris away from cutting edges 158.

Figure 8:
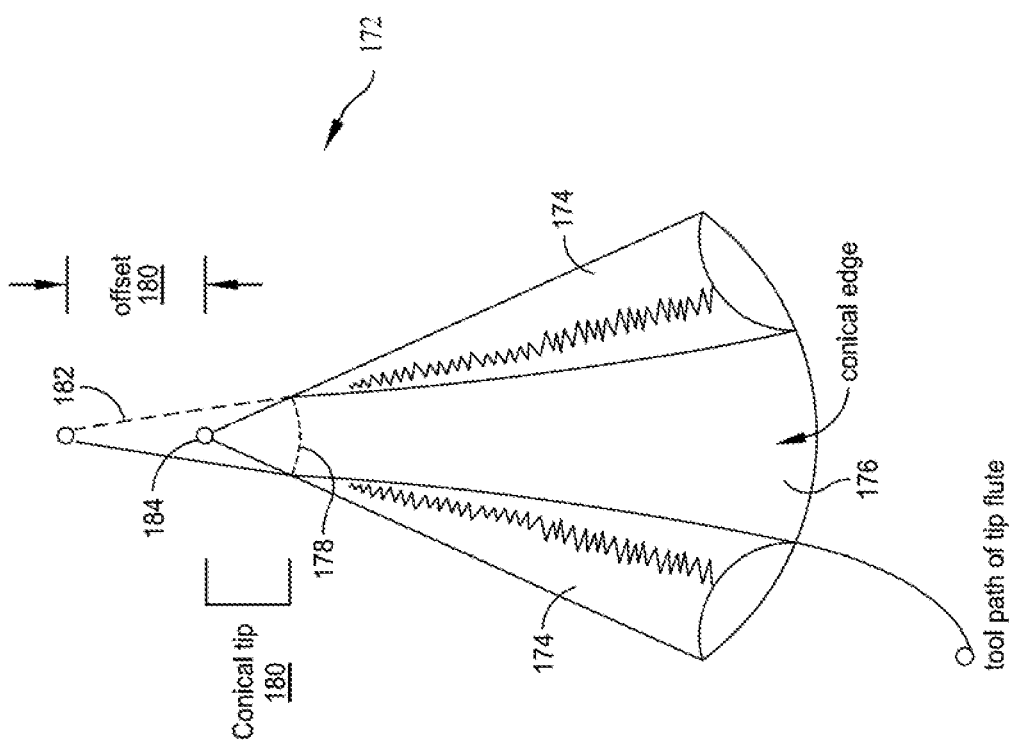
FIG. 8 depicts a side view of a cutting element of the invention.

FIG. 8 depicts a side view of cutting element 172. Gashes 174 in shaft are formed such that face 176 forms a conical surface. The conical tip 180 extends from a boundary 178 to a point 184. Boundary 178 of conical tip 180 marks a boundary of gashes 174. As shown conical tip 180 does not include flutes or gashes. In some embodiments, a conical tip may include flutes and/or gashes. Cutting edges and the angle at which the gashes 174 are cut are depicted by the projection 182. Angles formed between the central longitudinal axis of cutting element 172 and gashes 174 may differ from the angle with conical tip 180 as is shown by offset 186 from the projected cutting angle 182 used for gashes 174. In alternate embodiments, the angles of the gashes and conical tip may not be offset from each other. For example, the angles of the gashes and the conical tip may be substantially the same.

A number of gashes for any given cutting element may be selected based on use. In some embodiments, a cutting element may include a number of gashes in a range from about one to about 10. In particular, cutting elements of interest may have gashes in a range from about two to about six gashes extending from the tip down the cutting portion to the shaft of cutting element. Given a constant gash size, a number of gashes may affect the strength of the cutting element. For example, as a number of gashes of the same size increases, the relative strength of the cutting elements may decrease, given other factors are constant.

In some instances, a design of various aspects of a cutting element (e.g., flutes, gashes, tips, cutting edges, chip splitters, etc.) and/or materials used may be selected to increase the relative strength of the cutting element. Thus, selection of design elements and/or materials may be made such that specific characteristics and/or capabilities are imparted to the cutting element.

Figure 9:
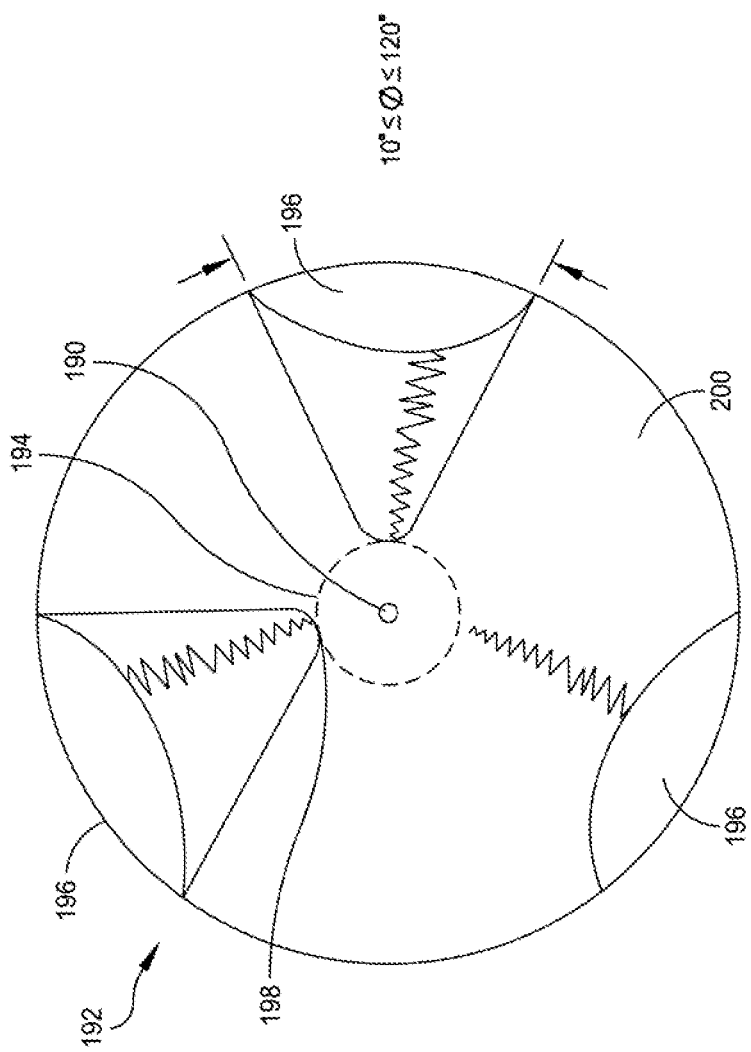
FIG. 9 depicts an end view of a cutting element of the invention.
Figure 10:
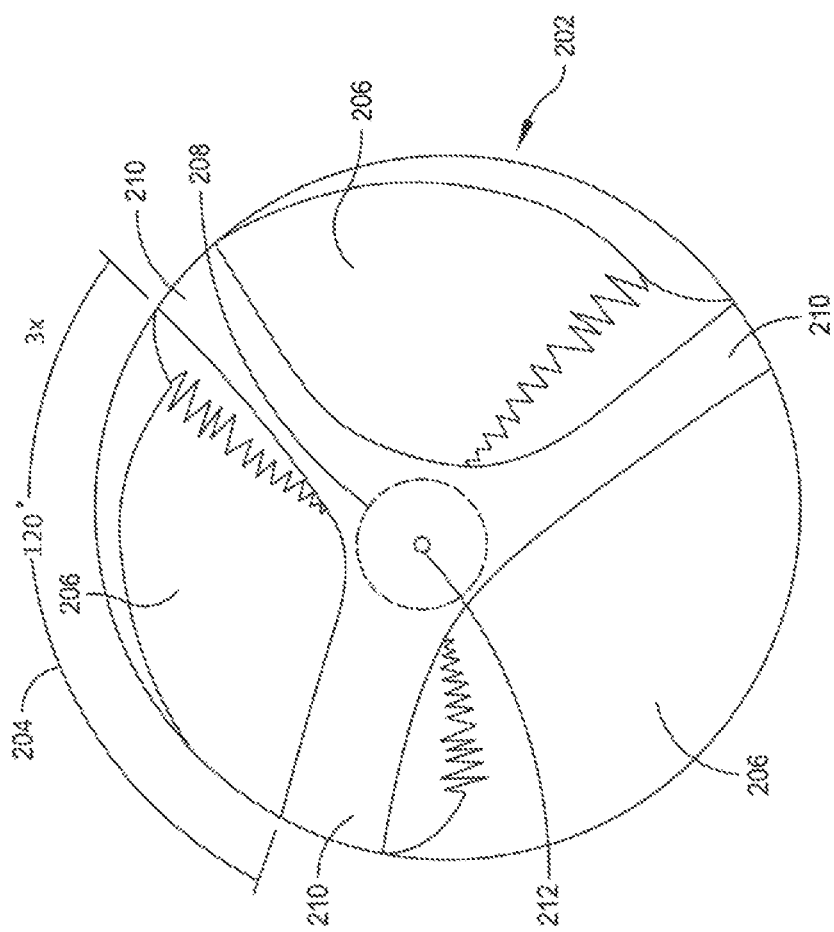
FIG. 10 depicts an end view of a cutting element of the invention.

In some embodiments, gashes do not extend to an end of the cutting portion as shown in FIGS. 8-10. A strength of cutting portion may be increased when the cutting portion does not include gashes. In alternate embodiments, gashes may extend into cutting portion. For example, there may be embodiments where gashes extend to an end of cutting portion.

Gashes may vary in size depending on the use, material to be cut, etc. For example, cylindrical drill bits may include gashes having various sizes as shown in FIGS. 9-10. FIG. 9 shows an end view of point 190 of drill bit 192. Tip 194 includes point 190. Gashes 196 may be offset from end of tip 194. As shown in FIG. 9, gashes 196 start at boundary 198 of tip 194. When measured with respect to the circumference of a cylindrical drill bit 192, each of the gashes 196 may be in range from greater than about 10° to less than about 120°. In some embodiments, the gashes may be spaced equidistantly from each other. As shown in FIG. 9, three gashes 196 extend from boundary 198 down shaft 200 of cutting element 192.

In some embodiments, flutes may vary in size. Differences may include a geometry of the flutes, for example, the interior shape of the flute (e.g., how much material is cut out), size of the arc of the flute, degrees of the outer circumference of the cutting element that encompass the flute, etc. While the degrees of the outer circumference may vary from flute to flute, the size of the flute measured in degrees also varies along a longitudinal axis of the cutting element. As shown in FIG. 10, faces 210 extend from cutting portion to conical tip 208 such that an intersection of faces 210 forms point 212. Point 212 and conical tip 208 are shown at the center of cutting element 202.

For example, as shown in the end view of cutting element 202 depicted in FIG. 10, length 204 indicates maximum length of flute 206 along the cross-sectional circumference of cutting element 202. Moving from this position along the longitudinal axis of the cutting element 202 toward conical tip 208 a geometry of the flutes 206 changes.

In some embodiments, flutes positioned on a cutting element may be of substantially the same size and may be positioned substantially equidistant from each other on a surface of cutting element at a particular point along the longitudinal axis of the cutting element. Some cutting elements are formed such that the flutes are substantially the same sized and spaced equally from each other along any particular point along the longitudinal access of the cutting element.

Flutes may direct debris formed while drilling away from the cutting area while being drilled. Flutes may vary in shape and/or size along a length of the shaft. For example, a first section of a flute may have a first geometry and a second section of flute may have a second geometry. In some embodiments, flutes may have a cross-section selected for a particular use. For example, flutes may have a cross-section that corresponds to an arcuate semi-cylindrical shape, a V-shape, square shape, and/or combinations thereof.

Figure 11:
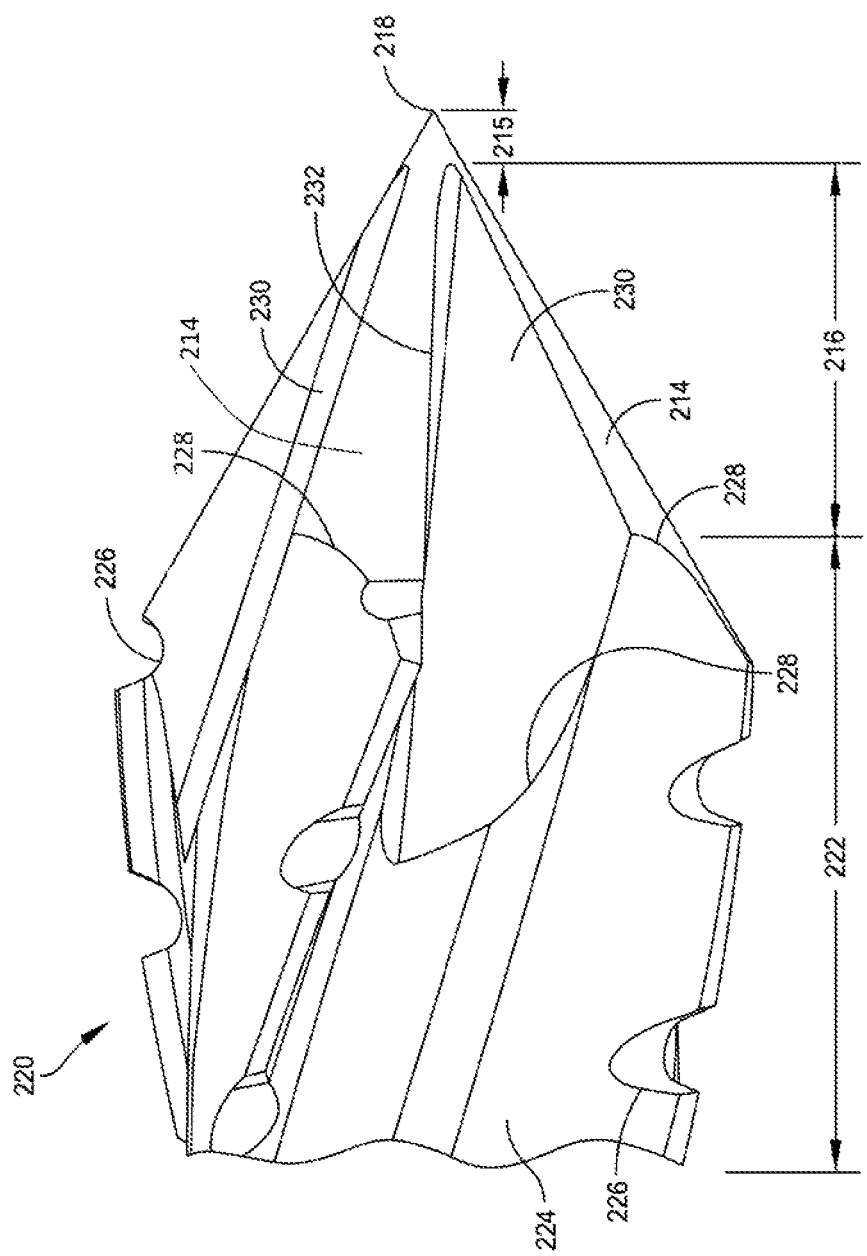
FIG. 11 depicts a side perspective view of a tip, in particular a conical gashtip, for a cutting element of the invention.

As shown in FIG. 11, faces 214 extend from cutting portion 216 at a predetermined angle relative to a central longitudinal axis of the cutting element 220 and intersect to form conical tip 215 and point 218. Point 218 and conical tip 215 are shown at the center of cutting element 220. Cutting portion 216 includes gashes 230 and faces 214.

Faces 214 may vary in size and shape. For example, faces may vary in size along the length of shaft. In some instances, different faces of the shaft may vary in size and/or shape from one another within a cutting element.

FIG. 11 depicts a side perspective view of cutting portion 216 coupled to shaft 222. As shown, cutting portion 216 includes gashes 230 and faces 214. This particular embodiment of cutting element 220 includes cutting portion 216 with shaft 222 having multiple flutes 224 with chip splitters 226. Faces 214 of cutting portion 216 extend to point 218 and boundary 228. The boundary between the cutting portion 216 and the shaft 222 may be irregular. For example, as shown in FIG. 11, boundary 228 follows the intersection between faces 214 and gashes 230 of cutting portion 216 and flutes 224 of shaft 222. As shown in FIG. 11, cutting portion 216 includes gashes 230. The intersection of faces 214 and gashes 230 forms cutting edges 232. Shaft 222 includes flutes 224 having chip splitters 226 starting at a predetermined distance from point 218. For example, flutes 224 extend from boundary 228 of cutting portion 216.

Gashes 230 intersect flutes 224 in such a way as to guide debris away from the cutting location during use.

A number of flutes for any given cutting element may be selected based on use. In some embodiments, a cutting element may include a number of flutes in a range from about one to about 10. In particular, cutting elements of interest may have flutes in a range from about two to about six flutes extending from the tip down the shaft of cutting element. Given a constant flute size a number of flutes may affect the strength of the cutting element. For example, as a number of flutes of the same size increases, the relative strength of the cutting elements may decrease, given other factors are constant.

Figure 12:
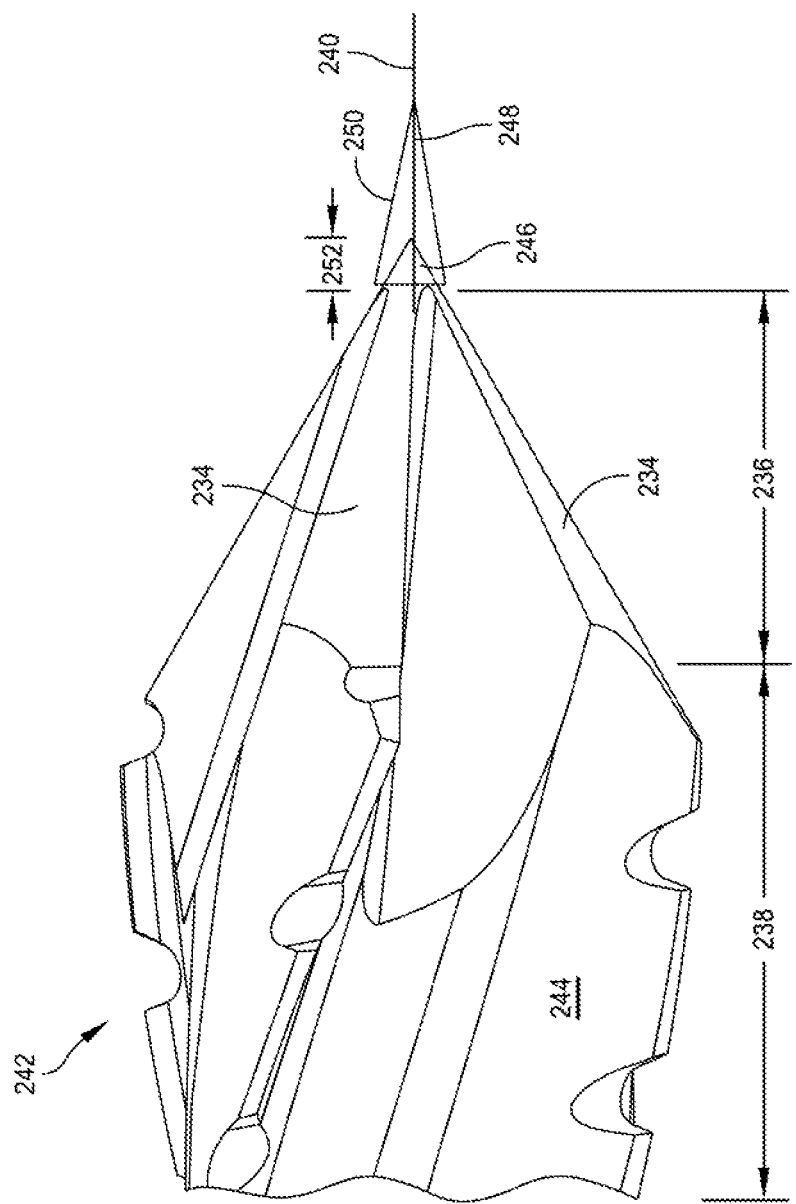
FIG. 12 depicts a side perspective view of a tip, in particular a conical tip, for a cutting element of the invention.

Flutes may vary in size depending on the use, material to be cut, etc. For example, substantially cylindrical drill bits may include flutes having various sizes as shown in FIGS. 11-12. As shown in FIG. 11, flutes 244 start at boundary 228 of cutting portion 216. Boundary 228 is irregular and follows the intersection of the shaft 222 and tip 215. In particular, the boundary 228 may be influenced by the flutes 224, gashes 230, and/or faces 214. When measured with respect to the circumference of a cylindrical cutting element 220 each of the flutes 224 may be in range from greater than about 10° to less than about 120°. In some embodiments, the flutes may be spaced equidistantly from each other.

In some embodiments, flutes may vary in size. Differences may include a geometry of the flutes, for example, the interior shape of the flute (e.g., how much material is cut out), size of the arc of the flute, degrees of the outer circumference of the cutting element that encompass the flute, etc. While the degrees of the outer circumference may vary from flute to flute, the size of the flute measured in degrees also varies along a longitudinal axis of the cutting element.

FIG. 12 depicts a side perspective view of a tip, in particular a conical tip 252, for a drill bit 242 of the invention. As shown, an angle 246 that surfaces 234 of conical tip 252 form with central axis 240 of cutting element 242 may differ from an angle 248 that flutes 244 of shaft 238 form with the central axis 240 of cutting element 242 as is depicted by the projection 250 of the angle 248 that flutes 244.

An example of an embodiment of a drill tip on the end of a cutting burr may include gashes on a cutting portion of the cutting element. Gashes on the cutting portion may intersect flutes on a shaft of the cutting element. In some instances, two gashes positioned on the cutting portion are in communication with two flutes positioned on a shaft of the cutting element. When gashes and flutes are in communication debris may be guided away from the cutting location during use.

Gashes may intersect with flutes of the shaft of a cutting element in such a way as to guide debris away from the cutting location.

Some embodiments involve a tip that includes gashes after some predetermined distance from the point. The predetermined distance between the point and the start of the gashes may depend upon the desired use, material to be cut, preferred angle of entry into the material to be cut, etc. Faces may extend from the point in a continuous manner at a preselected angle with respect to the central longitudinal axis. Gashes may intersect with the primary side-cutting flutes in such a way as to guide debris away from the cutting location.

Any of the designs, elements thereof, for example, of cutting elements, tip geometries and/or geometries of cutting portions, and/or materials described herein may be used in cutting elements, such as drill bits, k-wires, burrs such as orthopedic cutting burrs, or the like.

Materials for the cutting device sections may be selected based on use and the requirements thereof. It may be desirable that materials selected have certain preselected properties, for example, a specific hardness, wearability, toughness, surface roughness, strength, compatibility with in vivo placement, heat resistance, abrasion resistance, an ability to be sterilized, for example, able to withstand autoclaving, machinability, ability to be formed such as machinability and/or an ability to be formed using additive manufacturing such as 3D printing, selective laser sintering (SLS), machining, and/or molding, etc.

Materials of interest for use in cutting elements such as tips, drill bits, k-wires, and/or elements thereof may include but are not limited to metals, titanium, tantalum, and niobium, alloys like stainless steel such as surgical quality stainless steel, cobalt-chromium alloys, titanium alloys, aluminum alloys, and/or nitinol. For example, for use in medical applications, cutting elements such as drill bits, k-wires, and/or burrs may be formed from surgical quality stainless steel.

Cutting elements described herein may be utilized in surgical methods in which the cutting elements such as k-wires, burrs, and/or drill bits are attached to a powered element, for example, a powered device, drill, or the like. The resulting tool may be used to cut bone, cartilage or the like.

For example, an end of cutting elements, such as a drill bit, may have a geometry configured to engage a device during use. For example, a drill bit may be mounted in a device, such as a hand-held drill. In some embodiments, an end of the cutting element opposite the point may include features such as grooves, graduations, cut-aways, or the like to engage a device capable of moving the cutting element during use. For example, the end of the cutting element opposite the point may engage a device, such as a surgical drill, capable of rotating the cutting element during use.

In some embodiments, shafts of a cutting element may have a substantially cylindrical shape and/or a substantially circular cross-section. In alternate embodiments, other cross-sectional shapes may be used for the shaft of the cutting elements, such as hexagonal or octagonal shapes.

In an alternative embodiment, a cutting element, such as a drill bit, a k-wire, and/or a burr, for use in medical procedures may include an engaging point configured to engage a biological material. The tip may be positionable at one or more angles relative to the surface to be cut, for example, a biological material. A medical element for use in cutting may include a conical tip proximate the engaging point. Cutting portion may be positioned proximate to the tip. In some instances, faces may extend to the cutting portion and the faces of the cutting portion may form outer surfaces of the element. Further, the tip may include sections in which one or more gashes are formed. Cutting edges may be positioned on the tip. For example, in some instances, a cutting edge that is configured to cut the biological material may be formed at an intersection of the one or more faces and the one or more gashes. Elements for cutting in medical produces may also include a shaft portion proximate the tip of the element. The shaft may include flutes that include a plurality of chip splitters at edges of the flutes. In some instances, flutes on a shaft communicate with gashes positioned on a tip such. Flutes and/or gashes may be designed to guide debris away from a cutting location.

In some embodiments, faces of a conical tip may form an angle in a range from about 20° to about 80° with a central longitudinal axis running through the middle of cutting element, such as a drill bit, a k-wire, and/or a burr. In some instances, an angle formed between one or more faces of the tip and the central longitudinal axis of the cutting element may be in a range from about 30 to about 60 degrees. In a particular example, an angle formed between one or more faces of the tip and the central longitudinal axis of the cutting element may be in and of about 30 degrees.

In some embodiments, at least one of the one or more gashes forms an angle with the central longitudinal axis of the cutting element, such as a drill bit, a k-wire, and/or a burr, in a range from about 10 degrees to about 40 degrees. In a particular example, at least one of the one or more gashes forms an angle with a central longitudinal axis of the cutting element may be of about 18 degrees.

Those skilled in the art will appreciate that the invention described herein is susceptible to variations and modifications other than those specifically described. It should be understood that the invention includes all such variations and modifications which fall within the spirit and scope of the invention.

What is claimed is:

1. A cutting element comprising:
    an engaging point configured to engage a material to be cut;
    a tip proximate the engaging point;
    a cutting portion comprising:
    one or more faces forming at least a surface of the cutting portion;
    one or more gashes formed in the cutting portion;
    a cutting edge formed at an intersection of the one or more faces and the one or more gashes; and
    a shaft portion proximate the cutting portion, the shaft portion comprising one or more flutes, wherein edges of the one or more flutes are discontinuous, and a size of a flute of the one or more flutes varies along a longitudinal axis of the cutting element, wherein at least one edge of the edges comprise a plurality of chip splitters, and wherein each chip splitter of the plurality of chip splitters comprise an elliptical arc, wherein a first vertex of a major axis of an ellipse defining the elliptical arc is further from the engaging point and closer to the longitudinal axis of the cutting element than a second vertex of the major axis of the ellipse.

2. The cutting element of claim 1, wherein at least one of the one or more flutes communicate with at least one of the one or more gashes such that debris is guided away from a cutting location.

3. The cutting element of claim 1, wherein the tip forms an angle with a central longitudinal axis of the cutting element in a range from 20 degrees to 80 degrees.

4. The cutting element of claim 1, wherein the tip forms an angle with a central longitudinal axis of the cutting element in a range from 30 degrees to 60 degrees.

5. The cutting element of claim 1, wherein the tip forms an angle with a central longitudinal axis of the cutting element of about 30 degrees.

6. The cutting element of claim 1, wherein at least one of the one or more gashes forms an angle with a central longitudinal axis of the cutting element in a range from 10 degrees to 40 degrees.

7. The cutting element of claim 1, wherein at least one of the one or more gashes forms an angle with a central longitudinal axis of the cutting element of 18 degrees.

8. The cutting element of claim 1, wherein the cutting element comprises a drill bit, a k-wire, and/or a burr.

\* \* \* \* \*